UNITED STATES PATENT OFFICE.

OTTO REINHARDT AND JULIUS HOERLIN, OF UERDINGEN-ON-THE-RHINE, GERMANY, ASSIGNORS TO THE FIRM OF CHEMISCHE FABRIKEN VORM. WEILER-TER MEER, OF UERDINGEN-ON-THE-RHINE, GERMANY.

PROCESS OF MANUFACTURING BLACK SULFURIZED COLORING-MATTERS.

1,026,881. Specification of Letters Patent. Patented May 21, 1912.

No Drawing. Application filed December 5, 1906. Serial No. 346,511.

*To all whom it may concern:*

Be it known that we, OTTO REINHARDT, doctor of philosophy, chemist, a subject of the Grand Duke of Baden and the German Emperor, residing at Niederstrasse 1, Uerdingen-on-the-Rhine, Rhine Province, Kingdom of Prussia, German Empire, and JULIUS HOERLIN, doctor of philosophy, chemist, a subject of the King of Wurttemberg and the German Emperor, residing at Augustastrasse 3, Uerdingen-on-the-Rhine, Rhine Province, Kingdom of Prussia, German Empire, have jointly invented new and useful Improvements in Processes of Manufacturing Black Sulfurized Coloring-Matters, of which the following is a specification.

The present process consists in, that certain amounts of aqueous solutions of alkali polysulfids are heated under pressure with aromatic nitro-hydroxy compounds.

When compared with other processes for making sulfurized coloring matters this process shows an important difference, that according to the present invention the coloring matters are obtained in a crystalline and solid state, whereas in the hitherto known processes the coloring matters are obtained in a paste and must be precipitated from the resulting dissolutions, a process that is tedious and requires special apparatuses.

A further advantage is, that one can produce the same quantity of coloring matter as hitherto was only possible by the use of far larger amounts of alkaline polysulfids.

According to the present invention one can use as raw materials all aromatic nitro-hydroxy compounds, especially those containing the nitro groups in meta position, for instance dinitrophenol or the sodium compound of dinitrophenol or oxydinitrodiphenylamins; of the dinitrodiphenylamins we have found as very suitable the products of the condensation of dinitrochlorbenzol with para amidophenol or orthoamidophenol. Also the reduction products of the said nitro compounds may be used, as in the process a reduction of the nitro group to the amido group will enter.

The following examples will describe the manner, in which our invention may be carried out.

(1.) We mix a paste of sodium salt of 80 kilograms dinitrophenol and 240 liters water with a solution of 140 kilograms of crystallized sodium sulfid and 56 kilograms sulfur in 50 liters water and place the mixture into a closed iron vessel provided with a steam-jacket and an agitator. The mixture is heated unto 90 degrees centigrade. After that temperature having been obtained, one closes the vessel and heats within about 30 minutes unto 130 to 150 degrees centigrade, which temperature is maintained for about 4-9 hours. The pressure in the vessel will then be about 1½-4 atmospheres. After the said time the pressure is reduced to the ordinary atmospheric pressure. In order to expel ammonia formed during the process, one heats, and may absorb the expelled ammonia in diluted acids. The coloring matter is obtained in crystalline and solid form and may then be separated from the liquor by filtration, and may then be pressed and dried. The coloring matter obtained according to the described process has a greater dyeing power than the coloring matters obtained according to the hitherto known processes for manufacturing black sulfurized coloring matters and is obtained in a greater proportion. Temperature, time of heating and concentration may be changed according to the special conditions. At a lower temperature a longer time of heating will be required and inversely. The proportions may be increased until 2 molecules of polysulfid to 1 molecule dinitrophenol. The best result will be obtained with 1.3-1.5 molecules of polysulfid to 1 molecule dinitrophenol.

(2.) 55 kilograms p-oxy-$o_1$-$p_1$-dinitrodiphenylamin are put into a solution of 96 kilograms crystallized sodium sulfid, 52 kilograms sulfur and 70 liters water and heated in a closed iron vessel, provided with a steam-jacket and an agitator, for 4-8 hours to 120-160 degrees centigrade. The coloring matter is obtained in a crystalline form. The mixture after having been cooled is diluted with water, in order that the filtration may be carried out easily, and then separated from the liquor by filtration. The coloring matter is a dark-violet to black-blue powder, that is soluble in a diluted solution of sodium sulfid with a green color that is changed by the action of the air to dull blue-black. By varying the amount of sulfur, polysulfid, the temperature and the time of heating the coloring matter may be obtained with a green-blackish shade. Oxydizing agents convert the coloring matter into a more bluish product.

(3.) 59 kilograms o-p-dinitro-m'-m'-dichlor-p'-oxydiphenylamin are put into a solution of 64 kilograms sulfur in 120 kilograms sulfid of sodium and 100 liters water and are heated in an iron pressure vessel under agitation to 140-160 degrees centigrade for several hours. The coloring matter is separated in the same manner as described in the Example 2 and is a dark bluish powder with similar properties as those of the coloring matter according to Example 2. Instead of o-p-dinitro-m'-m'-dichlor-p'-oxydiphenylamin one may also use other substitution products of o-p-dinitro-p'-oxydiphenylamin, for instance bromated derivatives, also the corresponding derivates of o-amidophenol or the higher homologues. With these substances one obtains variations in the shade of the coloring matter that is however always obtained in a solid state.

What we claim as our invention, and desire to secure by Letters Patent, is:—

1. The process of manufacturing black surfurized coloring matters which consists in heating, under pressure, aqueous solutions of alkali polysulfids with aromatic nitro-hydroxy compounds.

2. The process of manufacturing blue-black or green-black sulfurized coloring matters which consists in heating an amount corresponding to between 1.5 molecules and 2.5 molecules of an alkali polysulfid in an aqueous solution under pressure with an amount corresponding to one molecule of oxydinitrophenylamin.

In witness whereof we have hereunto signed our names this 15th day of Nov. 1906, in the presence of two subscribing witnesses.

OTTO REINHARDT.
JULIUS HOERLIN.

Witnesses:
W. BRUCE WALLACE,
HERMANN MÜLLER.